United States Patent [19]

Watanabe et al.

[11] Patent Number: 4,706,945

[45] Date of Patent: Nov. 17, 1987

[54] HYDRAULIC MOUNTING SYSTEM FOR A POWER UNIT

[75] Inventors: Kenichi Watanabe; Haruyuki Taniguchi, both of Hiroshima, Japan

[73] Assignee: Mazda Motor Corporation, Hiroshima, Japan

[21] Appl. No.: 807,227

[22] Filed: Dec. 10, 1985

[30] Foreign Application Priority Data

Dec. 19, 1984 [JP] Japan .................................. 59-268846
Dec. 19, 1984 [JP] Japan .................................. 59-268847
Dec. 19, 1984 [JP] Japan .................................. 59-268849
Dec. 19, 1984 [JP] Japan .................................. 59-268851
Mar. 30, 1985 [JP] Japan .................................. 60-68306

[51] Int. Cl.$^4$ .............................................. F16F 3/00
[52] U.S. Cl. .................................... 267/186; 267/140.1
[58] Field of Search ..................... 188/285; 248/562; 267/11 A, 113, 140.1, 141

[56] References Cited

U.S. PATENT DOCUMENTS

| 2,705,118 | 3/1955 | Beck ........................................ 248/10 |
| 4,407,491 | 10/1983 | Kunihiro et al. ................. 267/140.1 |
| 4,505,461 | 3/1985 | Kakimoto ......................... 267/140.1 |
| 4,595,183 | 6/1986 | Dan et al. ......................... 267/140.1 |

FOREIGN PATENT DOCUMENTS

| 3340153 | 8/1984 | Fed. Rep. of Germany ... 267/140.1 |
| 161617 | 9/1983 | Japan . |
| 0151637 | 8/1984 | Japan ............................... 267/140.1 |
| 0231234 | 12/1984 | Japan ............................... 267/140.1 |

*Primary Examiner*—Duane A. Reger
*Attorney, Agent, or Firm*—Fleit, Jacobson, Cohn & Price

[57] ABSTRACT

A mounting system for a vehicle engine including mounting units located at the opposite sides of the engine output shaft. The mounting unit includes a hydraulic chamber filled with hydraulic liquid. The hydraulic chamber of one unit is connected with that of the other unit through a conduit which may be provided with an orifice or a valve. The hydraulic chamber is provided with a resilient membrane which can deflect under the pressure in the hydraulic chamber.

19 Claims, 11 Drawing Figures

HYDRAULIC MOUNTING SYSTEM FOR A POWER UNIT

BACKGROUND OF THE INVENTION

1. Field of the Invention

The present invention relates to mounting means for a power unit such as an engine, and more specifically, to hydraulic mounting means for a power unit. More specifically, the present invention pertains to mounting means for a power unit which is of a type including a pair of hydraulic mounting units located at the opposite sides of the output shaft of the power unit and having hydraulic chambers connected together by conduit means.

2. Description of the Prior Art

For mounting power units such as vehicle engines on supports such as vehicles bodies, conventional techniques use rubber mounts having spring coefficients which increase as the loads increase. Such rubber mounts are disadvantageous in that the natural frequencies of the mounting means become close to the frequencies of the secondary vibrations of the power units. In order to eliminate the problem, a proposal has been made by the Japanese patent application No. 57-41921 field on Mar. 17, 1982 and disclosed for public inspection on Sept. 26, 1983 under the disclosure No. 58-161617 to use hydraulic mounting units. According to the proposal, the mounting units are provided at the opposite sides of the power unit and each of the mounting units has an upper and lower hydraulic chambers separated by a flexible partition member which is connected with a leg member provided on the power unit. The upper chamber of one mounting unit is connected with the lower chamber of the other mounting unit through a conduit. Similarly the upper chamber of the other mounting unit is connected with the lower chamber of the one mounting unit. The proposed arrangement can provide an increased resistance to rolling oscillations of the power unit with a relatively soft support against vertical vibrations.

It should however be noted that the proposed arrangement is disadvantageous in that, due to the increased rigidity against the rolling movements, it becomes difficult to isolate torque variations of the power unit. Therefore, the torque variations of the power unit are transmitted to the support without being isolated by the mounting units.

The U.S. Pat. No. 2,705,118 issued to M. G. Beck on Mar. 29, 1955 discloses a resilient mounting system which includes a pair of mounting units located at the opposite sides of the output shaft of an engine and each having a rubber mount provided at a lower side with a hydraulic chamber. The hydraulic chamber of one mounting unit is connected with the hydraulic chamber of the other mounting unit through a conduit which may be provided with an orifice so that torsional vibrations are absorbed by the damping effect of the orifice. As described in the U.S. Pat. No. 2,705,118, the proposal is intended to provide an essentially rigid support insofar as the vertical translation is concerned but to make the torsional or rolling spring coefficient of the mounting system relatively small. The inventors have found however that it is not easy to decrease the rolling spring coefficient in this type of mounting system, because the rolling spring coefficient changes significantly in accordance with the frequency of the engine torque variations. It is understood that this tendency is produced due to the resonance of the fluid pressure in the conduit and has the following characteristics.

(1) Under a low frequency region, it is possible for the hydraulic fluid to move through the conduit connecting the hydraulic chambers of the mounting units so that the rolling spring coefficient is substantially equal to the static spring coefficient of the system. Thus, the rolling spring coefficient decreases in response to an increase in the frequency.

(2) As the frequency reaches a certain value fa, the rolling spring coefficient shows a minimum value and then increases relatively rapidly as the frequency increases beyond the aforementioned certain value. This tendency is understood as being produced by the fact that the inertia of the hydraulic fluid tends to prevent the flow through the conduit. At a second value fe of the frequency, the rolling spring coefficient becomes equal to the static spring coefficient of the system wherein the communication by the conduit is interrupted.

(3) The rolling spring coefficient increases further as the frequency increases beyond the aforementioned second value to a peak value which occurs at a third value fn of the frequency.

(4) Then, the rolling spring coefficient decreases as the frequency increases beyond the third value fn and finally approaches the static spring coefficient of the system wherein the communication through the conduit is interrupted.

It will therefore be understood that, in the mounting system as disclosed by the U.S. Pat. No. 2,705,118, it is impossible to maintain the rolling spring coefficient to a desirably low value. It should further be noted that the third value of the frequency at which the peak value of the rolling spring coefficient appears substantially corresponds to the engine idling speed or a speed slightly higher than the idling speed.

SUMMARY OF THE INVENTION

It is an object of the present invention to provide engine mounting means in which the rolling spring coefficient can be decreased satisfactorily under a frequency region corresponding to the engine idling speed.

Another object of the present invention is to provide power unit mounting means in which the rolling spring coefficient can be maintained in a relatively low range throughout the operation of the power unit.

According to the present invention, the above and other objects can be accomplished by mounting means for a power unit having an output shaft, the mounting means comprising mounting units located at the opposite sides of the output shaft for supporting the power unit on a base, each of said mounting units including resilient means between said power unit and said base to provide a resilient support for the power unit and hydraulic chamber means provided beneath the resilient means to apply a hydraulic pressure to the resilient means, the hydraulic chamber means in said mounting units being connected together by conduit means, said hydraulic chamber means in each of said mounting units being defined at least partially by resilient wall means which can deflect under the hydraulic pressure. According to the features of the present invention, the hydraulic chamber means of the mounting units are connected together by the conduit means so that it is possible in general to decrease the rolling spring coefficient of the mounting system. When the speed of the power unit is in such a range wherein the rolling rigidity is apt to rapidly increase, the resilient wall means are deflected under the hydraulic pressure to vary the volumes of the hydraulic chamber means so that it is possible to maintain the rolling rigidity low.

It is preferable to provide the conduit means with orifice means so that the rolling oscillation of the power unit can be absorbed. It is further preferable to provide each mounting unit with back-up pressure chamber means at a side of the resilient means opposite to the hydraulic chamber means, the back-up pressure chamber means being opened to the atmosphere through orifice means. The back-up pressure chamber means functions to suppress rapid deflections of the resilient wall means which may otherwise occur under bouncing of the vehicle equipped with the power unit.

The above and other objects and features of the present invention will become apparent from the following descriptions of preferred embodiments taking reference to the accompanying drawings.

DESCRIPTION OF THE PREFERRED EMBODIMENTS

Figure 1:
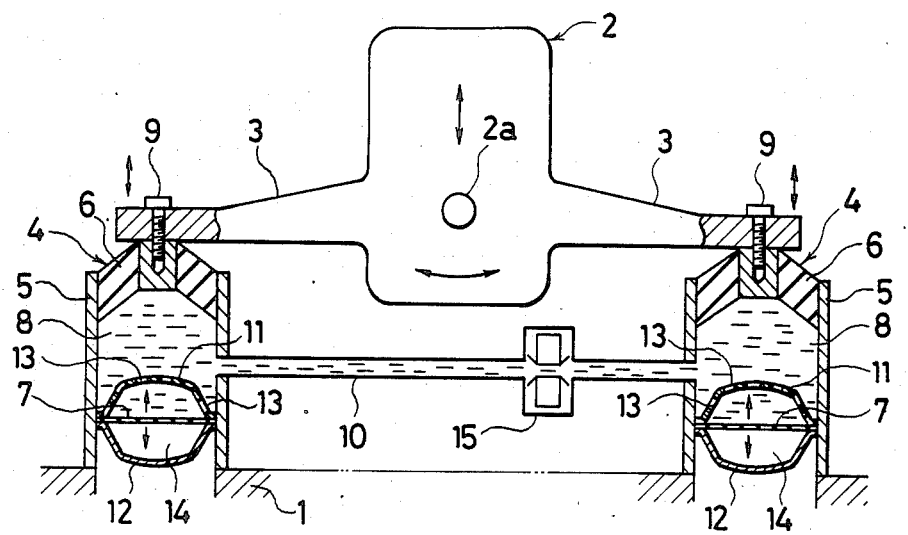
FIG. 1 is a sectional view of the engine mounting system in accordance with one embodiment of the present invention.

Referring to FIG. 1, there is shown a vehicle engine mounting system with which an engine 2 having an output shaft 2a is mounted on a vehicle body 1. The engine 2 has mounting arms 3 extending in the opposite directions from the output shaft 2a. Each of the mounting arms 3 is supported through a mounting unit 4 on the vehicle body 1. The mounting unit 4 includes a mounting rubber 6 attached to one end of a cylindrical case 5 which is secured at the other end to the vehicle body 1. The mounting rubber 6 is connected by means of a bolt 9 with the mounting arm 3.

In the casing 5, there is a resilient membrane 7 to define a hydraulic chamber 8 in the casing 5 between the mounting rubber 6 and the membrane 7. The hydraulic chamber 8 is filled with non-compressible hydraulic liquid. Beneath the resilient membrane 7, there is formed a closed air chamber 14 which is defined by a dish-shaped plate 12 which also functions to limit the movement of the membrane 7. In the hydraulic chamber 8, there is provided a stopper plate 11 for limiting the movement of the membrane 7. The stopper plate 11 is formed with a plurality of perforations 13 to allow free flow through the plate 11. The hydraulic chambers 8 are connected together by a conduit 10 which is provided with an orifice 15.

In operation, vertical oscillations of the engine 2 are resisted by the hydraulic fluid in the chambers 8 so that vertical movements of the engine 2 are allowed only through deformations of the mounting rubbers 6 and the resilient membranes 7. Therefore, a relatively hard support is provided. Under a rolling movement of the engine 2, the hydraulic fluid is moved through the conduit 10 from one chamber 8 to the other so that the rolling movement of the engine 2 is resisted only by the mounting rubbers 6. Therefore, a relatively soft support is provided for rolling movements of the engine 2. Since the conduit 10 is provided with the orifice 15, rolling oscillations can be absorbed.

Figure 2:
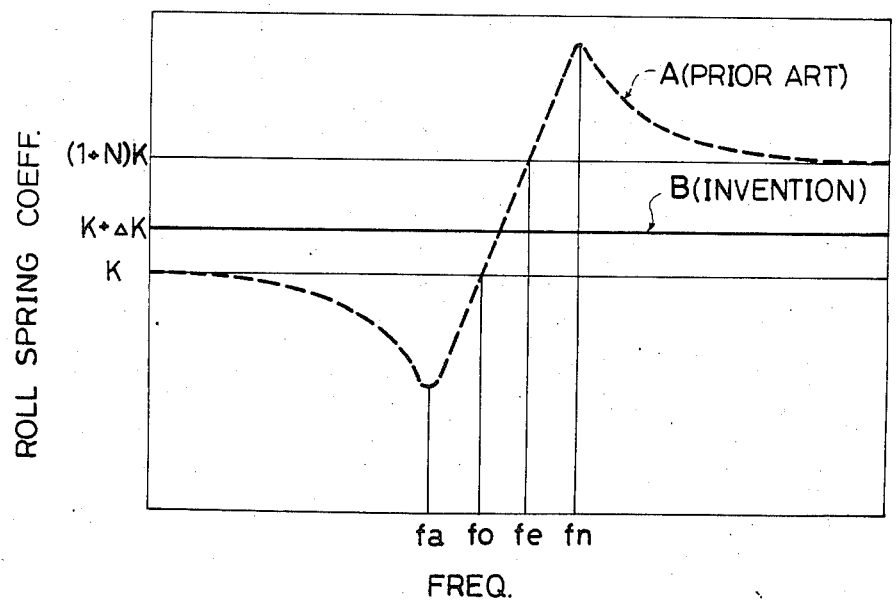
FIG. 2 is a diagram showing the relationship between the rolling spring coefficient and the frequency of the vibration.

In case where the hydraulic chambers 8 are of fixed volumes, the rolling spring coefficient of the mounting system changes as shown by a broken line A in FIG. 2 as already described. It will therefore be noted that the rolling spring coefficient increases significantly under the frequency fn. In the arrangement shown in FIG. 1, however, since the hydraulic chambers 8 are partly defined by the resilient membranes 7, deflections are produced in the membranes 7 to change the volumes of the hydraulic chambers 8 under a frequency range wherein the flow of hydraulic fluid through the conduit 10 is remarkably decreased or totally ceased. As the result, the rolling spring coefficient can be maintained substantially constant as shown by a solid line B in FIG. 2. It is therefore possible to maintain the rolling spring coefficient at a relatively low value.

Figure 3:
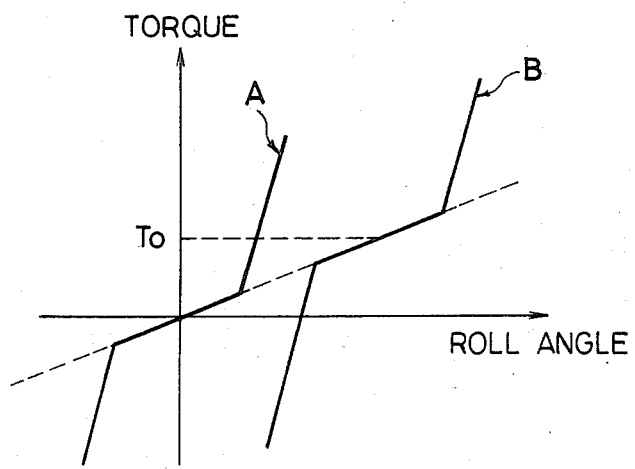
FIG. 3 is a diagram showing the relationship between the engine output torque and the roll angle.

When the engine output torque is increased for acceleration, the volume of one hydraulic chamber 8 tends to be decreased whereas the volume of the other hydraulic chamber 8 tends to be increased correspondingly. This will cause a fluid flow through the conduit 10 from the one chamber 8 to the other chamber 8. Thus, the relationship between the torque and the engine roll angle changes as shown by a line B in FIG. 3. Where the hydraulic chambers 8 are not connected together by the conduit 10, the roll angle changes as shown by a line A in FIG. 3. It will therefore be understood that the rolling rigidity is significantly decreased by the conduit 10.

In case where the engine output torque is rapidly changed, the resilient membranes 7 are deflected until they abut to either the plate 11 or 12 since there will be a certain delay in the fluid flow through the conduit 10. Thereafter, the membranes 7 are gradually returned to their neutral positions. Thus, the rolling rigidity is momentarily increased to prevent excessive rolling of the engine. The orifice 15 in the conduit 10 facilitates the aforementioned function by resisting the fluid flow through the conduit 10.

Figure 4:
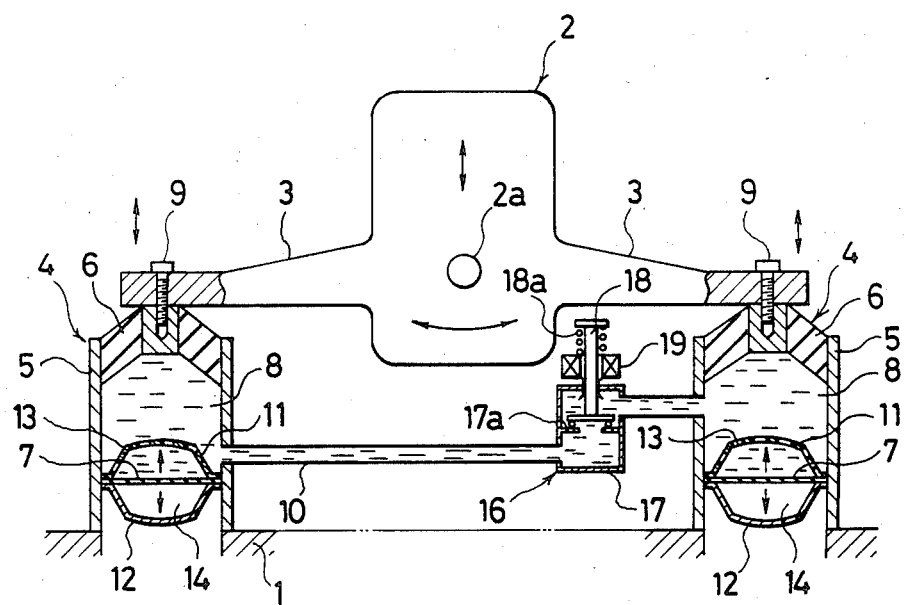
FIG. 4 is a sectional view similar to FIG. 1 but showing another embodiment of the present invention.

Referring now to FIG. 4 which shows another embodiment of the present invention, it will be noted that the embodiment shown therein is substantially the same as the previous embodiment except that the orifice 15 in the previous embodiment is substituted by a solenoid valve 16 which includes a valve casing 17 having a valve seat 17a and a valve member 18 adapted for engagement with the valve seat 17a. The valve member 18 is urged by means of a spring 18a toward an open position and a solenoid 19 is provided for forcing the valve member 18 toward a closed position when energized.

The arrangement is such that the valve member 18 is forced firmly toward the valve seat 17a when the valve member 18 is in the closed position under the hydraulic pressure produced by the reaction force of the forward tractive torque of the engine 2.

In this embodiment, when the solenoid valve 16 is opened, it is possible to obtain a function which is similar to that of the previous embodiment. The rolling rigidity is therefore decreased as shown by the line B in FIG. 3. When the solenoid valve 16 is closed, the rolling rigidity is increased as shown by the line A in FIG. 3. In the illustrated embodiment, the hydraulic pressure produced under the forward tractive torque functions to force the valve member 18 in the closed position toward the valve seat 17a. Therefore, it is possible to decrease the solenoid energizing current without having a danger of the valve member 18 being detached from the valve seat 17a.

Figure 5:
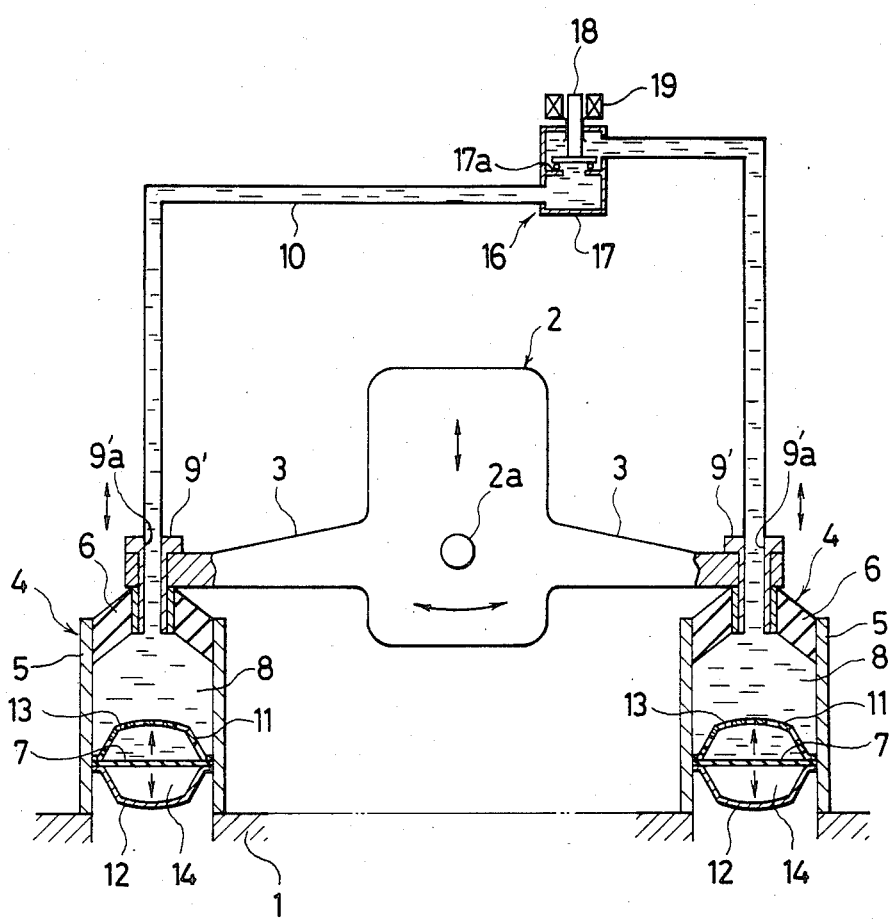
FIG. 5 is a sectional view showing a further embodiment.

Referring to FIG. 5 which shows a further embodiment of the present invention, the embodiment shown therein is different from the embodiment shown in FIG. 4 in that the conduit 10 is connected with the hydraulic chambers 8 through passages 9a formed in the bolts 9 connecting the mounting arms 3 with the mounting rubbers 6. The arrangement is suitable for a structure wherein the solenoid valve 16 is mounted on the body of the engine 2.

Figure 6:
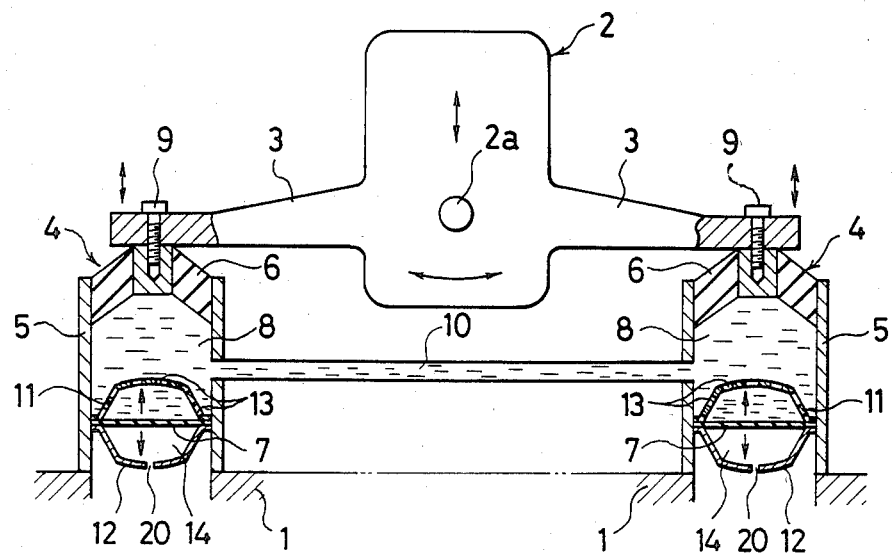
FIG. 6 is a sectional view showing still further embodiment.
Figure 7:
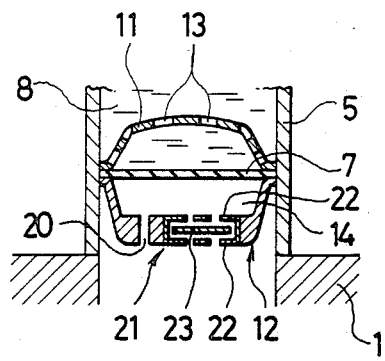
FIG. 7 is a fragmentary sectional view showing another embodiment of the present invention.

FIG. 6 shows a still further embodiment of the present invention. In this embodiment, the air chamber 14 defined by the dish-shaped plate 12 is opened to the atmosphere through an orifice 20 formed in the plate 12. The orifice 20 provides a damping effect to the movement of the resilient membrane 7. In the embodiment shown in FIG. 7, the plate 12 is provided with a valve 21 in addition to the orifice 20. The valve 21 is constituted by a pair of spaced apart, perforated plates 22 and a floating valve plate 23 disposed between the perforated plates 22. When the movements of the membrane 7 are relatively slow, the air flows into or out of the air chamber 14 through the orifice 20 and the perforations in the plates 22 so that no damping effect is produced. When the movements of the membrane 7 are fast, the air flow into and out of the air chamber 14 increases so that the floating valve member 23 is moved to contact one of the plates 22. Thus, only the orifice 15 is left open to produce a damping effect to the movements of the membrane 7.

Figure 8:
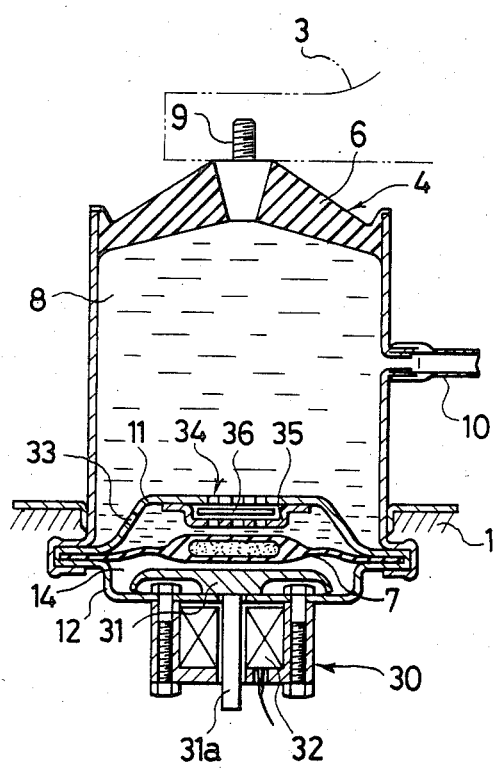
FIG. 8 is a fragmentary sectional view of a further embodiment.

Referring now to FIG. 8, the embodiment shown therein includes a solenoid operated stopper 30 for constraining movement of the membrane 7. The stopper 30 is mounted on the dish-shaped plate 12 defining the air chamber 14 and includes a stopper plate 31 located in the air chamber 14. The stopper plate 31 is attached to a push rod 31a which extends outwardly through the plate 12. A solenoid 32 is mounted on the plate 12 to encircle the push rod 31a. Where the solenoid 32 is de-energized, the stopper plate 31 is in the position shown in FIG. 8 but, when the solenoid 32 is energized, the stopper plate 31 is moved upward to constrain the movement of the membrane 7.

In the embodiment which is being described with reference to FIG. 8, the stopper plate 11 in the hydraulic chamber 8 is formed with an orifice 33 and a valve 34. The valve 34 includes a perforated plate 35 attached to the stopper plate 11 with a spacing therebetween. The stopper plate 11 is formed with perforations in the area surrounded by the plate 35. In the space between the plates 11 and 35, there is a floating valve member 36.

The valve 34 functions in the same manner as the valve 21 in the previous embodiment does.

When the solenoid 32 is de-energized, the membrane 7 is free to deflect and the hydraulic fluid flows through the orifice 33 and the valve 34 as long as the vertical movement of the engine 2 is slow. However, when the vertical movement is fast, the valve 34 is closed to allow the hydraulic fluid flow only through the orifice 33. Thus, the vertical oscillation of the engine 2 is absorbed due to the flow resistance provided by the orifice 33. In case where the solenoid 32 is energized, the stopper plate 31 prevents the downward movement of the membrane 7. The hydraulic pressure in the chamber 8 may tend to depress the membrane 7 and the stopper plate 31 downward. However, the aforementioned orifice 33 and the valve 34 function to prevent a high pressure from being transmitted through the stopper plate 11. Thus, the stopper plate 31 is not subjected to a strong downward force so that it is unnecessary to increase the energizing current to the solenoid 32.

Figure 9:
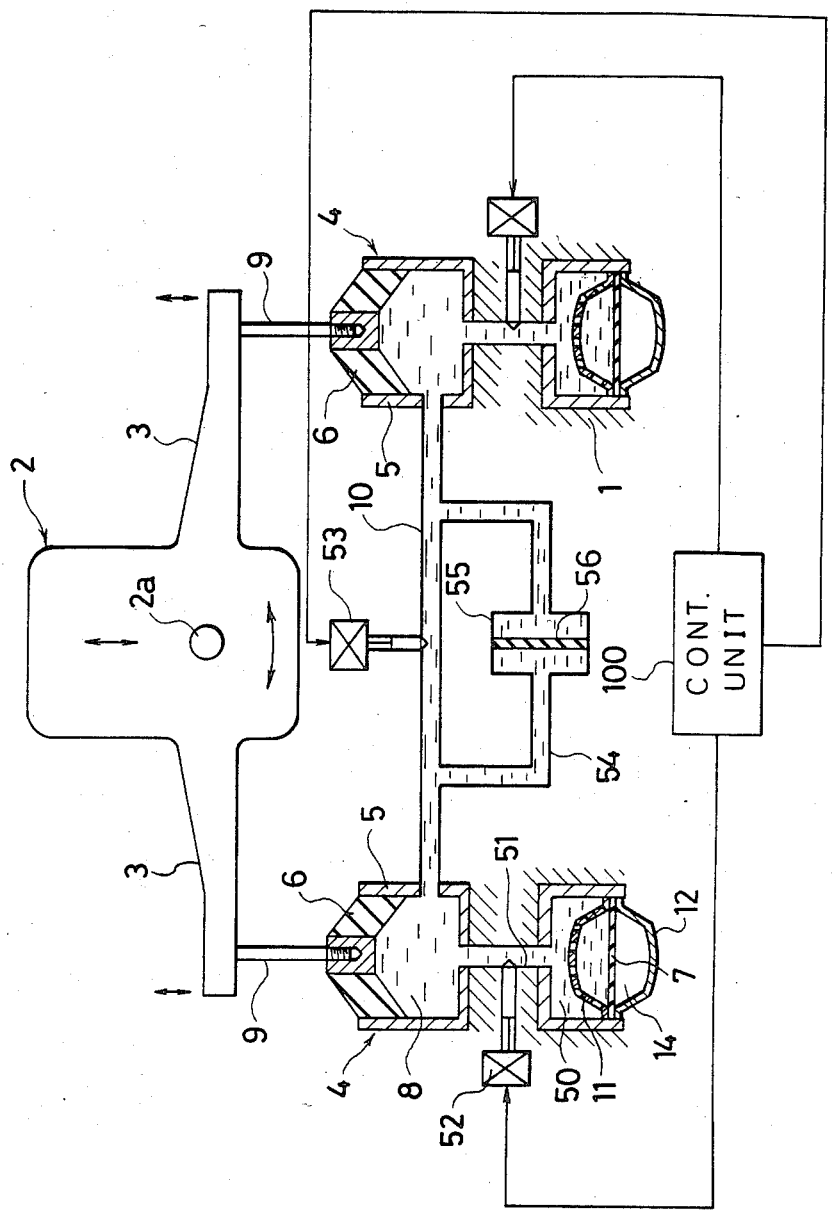
FIG. 9 is a sectional view showing another embodiment.

Referring now to FIG. 9, there is shown a further embodiment which includes an auxiliary hydraulic chamber 50 connected through a passage 51 with the main hydraulic chamber 8. The resilient membrane 7 is not located in the main chamber 8 but in the auxiliary chamber 50. A dish-shaped plate 12 is provided as in the embodiment of FIG. 1 to define a closed air space 14 beneath the membrane 7. Further, a perforated stopper plate 11 is provided above the membrane as in the previous embodiments. A solenoid operated shut-off valve 52 is provided in the passage 51. The solenoid valve 52 closes the passage 51 when energized.

In the conduit 10, there is provided a second solenoid valve 53 which closes the conduit 10 when energized. The conduit 10 is provided with a bypass passage 54 which bypasses the solenoid valve 53. In the bypass passage 54, there is an enlarged chamber 55 which is provided with a resilient membrane or diaphragm 56.

Figure 10:
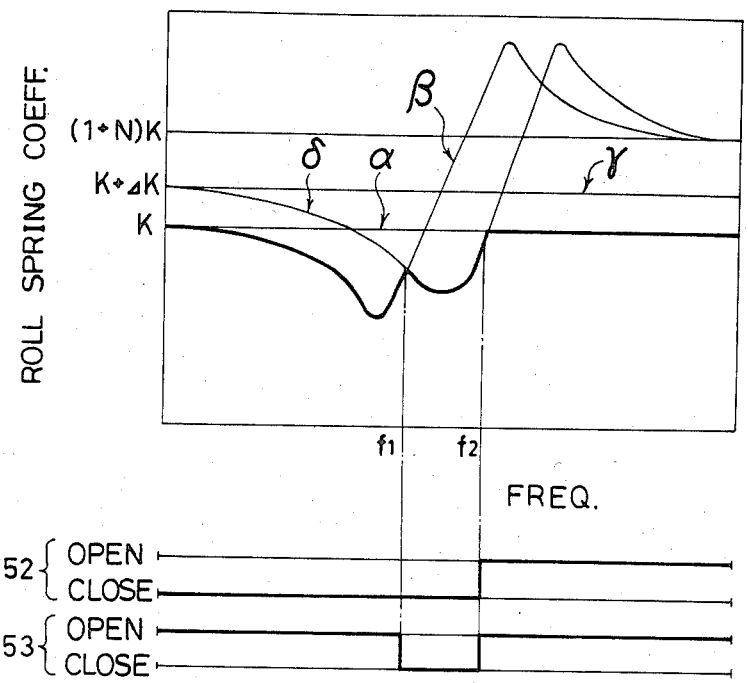
FIG. 10 is a diagram showing the function of the embodiment shown in FIG. 9; and, FIG. 11 is a sectional view showing still further embodiment.

When both the valves 52 and 53 are opened, the rolling spring coefficient of the mounting system is substantially constant as shown by a line $\alpha$ in FIG. 10. Since the auxiliary chamber 50 is in communication with the main chamber 8, the membrane 7 in the auxiliary chamber 50 can deflect under the pressure change in the main chamber 8.

When the solenoid valve 52 is closed, the function is similar to that of the system as disclosed by the U.S. Pat. No. 2,705,118. Therefore, the rolling spring coefficient changes as shown by a line $\beta$ in FIG. 10.

When the solenoid valve 52 is opened and the solenoid valve 53 is closed, the rolling spring coefficient is substantially constant but the value of the spring is larger than in the case where the solenoid valves 52 and 53 are both opened. This is because the resiliency of the membrane 56 has an influence on the spring coefficient.

When both of the valves 52 and 53 are closed, the rolling spring coefficient changes as shown by a line $\delta$. It will be noted that the line $\delta$ is similar to the line but shifted toward right due to the influence of the membrane 56 to control the operations of a control unit 100 is provided the valves 52 and 53 in accordance with the frequency of the rolling oscillation. The valve 52 is closed under the frequency lower than the value f2 at which the line $\delta$ intersects the line $\alpha$. The valve 53 is closed under the frequency f1 and f2, the value f1 being the frequency at which the lines $\beta$ and cross each other. With this control, the rolling spring coefficient changes as shown by a thick line in FIG. 10.

Figure 11:
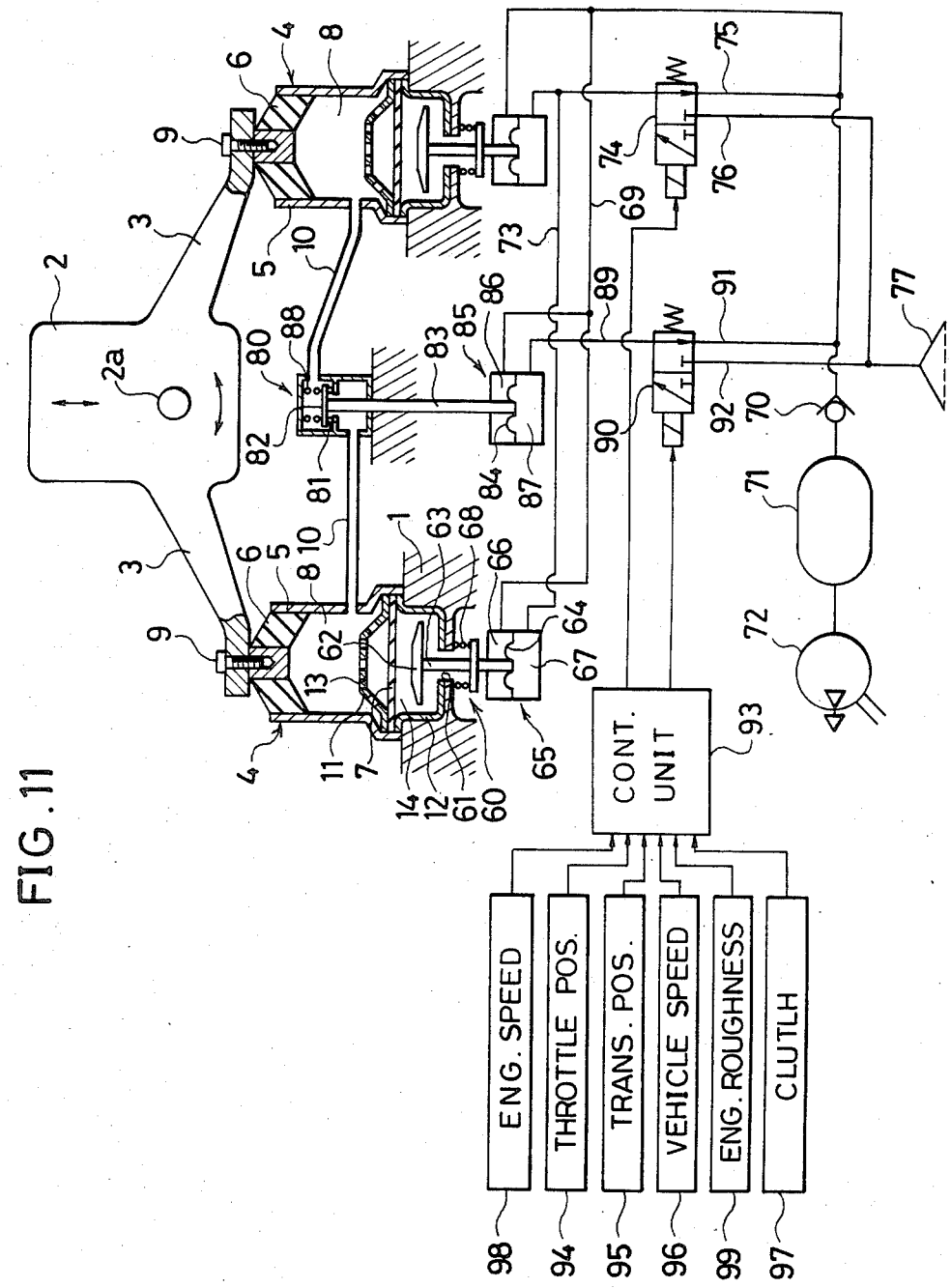

Referring now to FIG. 11, the dish-shaped plate 12 for defining the air chamber 14 is provided with a pneumatically operated stopper 60. The stopper 60 includes an opening 61 formed in the plate 12 and a stopper member 62 for limiting the movement of the membrane 7. The member 62 is connected with a stem 63 which is connected with a diaphragm 64 of a pneumatic actuator 65. The actuator 65 has a first and second chambers 66 and 67 formed at the opposite sides of the diaphragm 64. A spring 68 is provided for biasing the member 62 toward a lowered position. The chamber 66 which is closer to the plate 12 is connected through a line 69 and a check valve 70 with a vacuum tank 71 which is in turn connected with a vacuum pump 72. The suction pressure introduced into the chamber 66 functions to force the member 62 toward a raised position. The chamber 67 which is further from the plate 12 is connected through a line 73 with a solenoid valve 74. The solenoid valve 74 functions to connect the line 73 alternately with a line 75 or a line 76. The line 75 is connected through the check valve 70 with the vacuum tank 71. The line 76 is opened through a screen 77 to the atmosphere. When the solenoid valve 74 is actuated to connect the line 73 with the line 75, the suction pressure is introduced into the chamber 67 to actuate the valve member 62 into the lowered position.

In the conduit 10 connecting the hydraulic chambers 8 together, there is provided a pneumatically operated valve 80 which includes a valve seat 81 and a valve member 82 for cooperation with the valve seat 81. The valve member 82 is connected with a valve stem 83 which is in turn connected with a diaphragm 84 of a pneumatic actuator 85. The pneumatic actuator 85 has suction pressure chambers 86 and 87 which are provided at the opposite sides of the diaphragm 84. A spring 88 is provided to force the valve member 82 toward a closed position. The chamber 86 is connected with the line 69 so that it is continuously supplied with the suction pressure which functions to force the valve member 82 toward an open position.

The chamber 87 is connected through a line 89 with a solenoid valve 90 which functions to connect the line 89 alternately with a line 91 or a line 92. The line 91 is connected through the check valve 70 with the vacuum tank 71. The line 92 is opened to the atmosphere through the screen 77. When the line 89 is connected with the line 91, the suction pressure is introduced into the chamber 87 to thereby force the valve member 82 to the closed position.

In order to control the operation of the solenoid valves 74 and 90, there is provided a controller 93 which may be constituted by a microprocessor. The vehicle equipped with the engine 2 is provided with an engine throttle valve position detector 94 for detecting the position of the engine control foot pedal (not shown), a transmission position detector 95 for detecting the position of the transmission (not shown), a vehicle speed detector 96 for detecting the vehicle running speed and a clutch condition detector 97 for detecting that the clutch (not shown) is in engagement. Further, the engine 2 is provided with an engine speed detector 98 and an engine roughness detector 99. The signals from the detectors are applied to the controller 93 which then interprets the vehicle operating condition. When it is judged that the engine output torque is not high and the engine rolling oscillation is of a frequency which is higher than the frequency 50 where the line A in FIG. 2 intersects the line K, the controller 93 produces a signal to energize the solenoid valve 90 to open the chamber 87 to the atmosphere so that the valve 80 is opened. At the same time the solenoid valve 74 is de-energized and the chambers 67 of the actuators 65 are connected with the vacuum tank 71. Thus, the stoppers 60 are lowered. Therefore, the membrane 7 becomes free to move so that the rolling spring coefficient becomes substantially constant as shown by the line B in FIG. 2. Where the rolling oscillation is of a frequency lower than the value f0, the controller 93 produces a signal to energize the solenoid valve 74 so that the chambers 67 are opened to the atmosphere. Thus, the stopper members 62 are raised to constrain the membrane 7. The rolling spring coefficient then changes as shown by the line A in FIG. 2.

When it is judged that the engine output torque is high, the solenoid valve 90 is energized to connect the chamber 87 with the vacuum tank 71. Therefore, the valve 80 in the conduit 10 is closed. If the stopper member 62 is in the lowered position, the membrane 7 is free to deflect so that the rolling oscillation is resisted by the deflections of the mounting rubber 6 and the membrane 7. If the stopper member 62 is in the raised position, the rolling rigidity can be further increased.

The invention has thus been described with reference to specific embodiments, however, it should be noted that the invention is in no way limited to the details of the illustrated structures but changes and modifications may be made without depanting from the scope of the appended claims.

We claim:

1. A mounting system for a power unit having an output shaft, the mounting means comprising mounting units located at opposite sides of the output shaft for supporting the power unit on a base, each of said mounting units including resilient means between said power unit and said base to provide a resilient support for the power unit and hydraulic chamber means provided beneath the resilient means to apply a hydraulic pressure to the resilient means, the resilient means being exposed to the hydraulic chamber means so that a deflection of the resilient means causes a change in volume of the chamber means, the hydraulic chamber means in said mounting units being connected together by conduit means, resilient wall means separate from the resilient means and exposed to the hydraulic chamber means in each of the mounting units for deflection under the hydraulic pressure.

2. A mounting system in accordance with claim 1 which includes constraining means selectively movable to a constraining position in which said constraining means constrains deflection of said resilient wall means.

3. A mounting system in accordance with claim 2 which includes means for moving the constraining means into said constraining position when rolling frequency is low.

4. A mounting system in accordance with claim 1 in which said hydraulic chamber means includes a first chamber and a second chamber which is connected with said first chamber through orifice means, said resilient wall means facing to said second chamber means, said conduit means being opened to said first chamber.

5. A mounting system in accordance with claim 4 which includes valve means provided in parallel with said orifice means between said first and second chambers, said valve means of a type which closes under a high pressure difference between said first and second chambers.

6. A mounting system in accordance with claim 3 in which said moving means includes solenoid means.

7. A mounting system in accordance with claim 3 in which said moving means includes pneumatic actuator means.

8. A mounting system in accordance with claim 2 in which said conduit means is provided with valve means for closing said conduit means.

9. A mounting system in accordance with claim 8 which includes electronic control means for operating said constraining means in accordance with operating conditions of the power unit.

10. A mounting system in accordance with claim 1 which includes first stopper means for restricting deflection of said resilient wall means in a direction of increasing volume of the hydraulic chamber means, and second stopper means for restricting deflection of said resilient wall means in the opposite direction.

11. A mounting system in accordance with claim 10 in which said first stopper means includes a stopper plate formed with at least one perforation.

12. A mounting system in accordance with claim 10 in which said second stopper means includes a plate which defines a closed air space between the resilient wall means and the plate.

13. A mounting system in accordance with claim 10 in which said conduit means is provided with orifice means.

14. A mounting system for a power unit having an output shaft, the mounting means comprising mounting units located at the opposite sides of the output shaft for supporting the power unit on a base, each of said mounting units including resilient means between said power unit and said base to provide a resilient support for the power unit and hydraulic chamber means provided beneath the resilient means to apply a hydraulic pressure to the resilient means, the hydraulic chamber means in said mounting units being connected together by conduit means, said hydraulic chamber means in each of said mounting units being defined at least partially by resilient wall means which can deflect under the hydraulic pressure, said resilient means facing to said hydraulic chamber means and connected with said power unit through connecting bolt means, said conduit means being formed through said bolt means.

15. A mounting system in accordance with claim 12 in which said plate of the second stopper means includes orifice means through which said air space is opened to the atmosphere.

16. A mounting system in accordance with claim 15 in which said plate of the second stopper means includes valve means in parallel with said orifice means, said valve means being of a type which closes under a high pressure difference between the air space and the atmosphere.

17. A mounting system in accordance with claim 1 in which said hydraulic chamber means includes a main chamber and an auxiliary chamber which are connected together by passage means, said resilient wall means being provided to face to the auxiliary chamber means, valve means being provided in said passage means, resilient means being provided to face to said main chamber and carry said power unit.

18. A mounting system in accordance with claim 17 which includes means for closing the valve means under a low frequency range of rolling oscillation.

19. A mounting system in accordance with claim 18 in which said conduit means is provided with valve means and bypass passage means bypassing said valve means, second resilient wall means provided in said bypass passage means.

* * * * *